P. DENNIS.
Shovel-Plow.

No. 55,630. Patented June 19, 1866.

Witnesses:

Inventor:
P. Dennis

UNITED STATES PATENT OFFICE.

PAUL DENNIS, OF SCHUYLERVILLE, NEW YORK.

IMPROVEMENT IN SHOVEL-PLOWS.

Specification forming part of Letters Patent No. 55,630, dated June 19, 1866.

*To all whom it may concern:*

Be it known that I, PAUL DENNIS, of Schuylerville, in the county of Saratoga and State of New York, have invented a new and Improved Shovel-Plow; and I do hereby declare that the following is a full, clear, and exact description thereof, which will enable those skilled in the art to make and use the same, reference being had to the accompanying drawings, forming part of this specification, in which—

Figure 1:
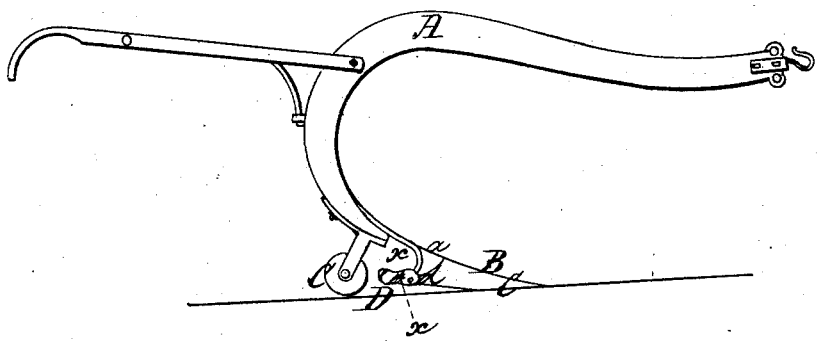
Figure 2:
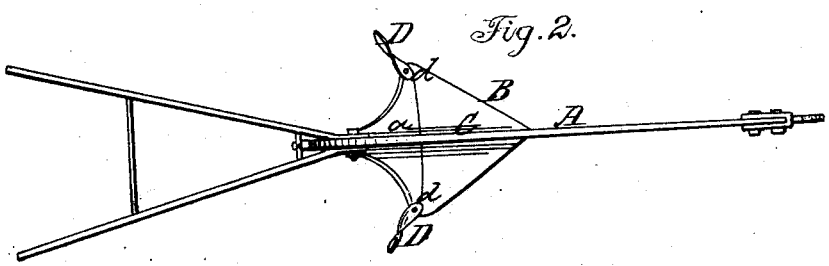
Figures 3, 4:
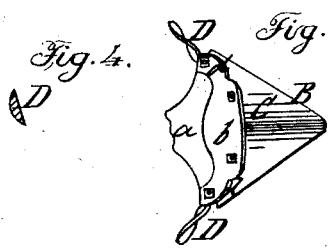
Figure 5:
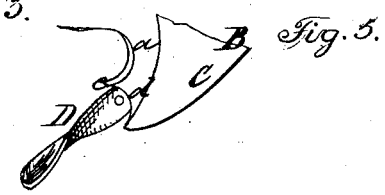

Figure 1 is a side view of my invention; Fig. 2, a plan or top view of the same; Fig. 3, an inverted plan of the same; Fig. 4, a transverse section of one of the wings pertaining to the same, taken in the line $xx$, Fig. 1; Fig. 5, an enlarged side view of the plow.

Similar letters of reference indicate corresponding parts.

This invention relates to certain new and useful improvements on a shovel-plow for which Letters Patent were granted to me, February 23, 1858, and reissued August 4, 1863.

The present invention consists in the employment or use of adjustable wings of twisted or curved form and applied to the plow in such a manner as to be capable of being reversed or changed in position from one side of the plow to the other, in order to cast the earth outward from the plow to a greater or less extent, according as it is desired to throw the dirt away from the furrow or allow it to fill the same, as hereinafter fully set forth.

A represents the beam of the plow, which may be of metal, of curved form, and in one piece, the rear part extending down in semicircular shape, so as to serve as the standard for the plow B, which is bolted to it.

The plow, considered as a whole, is constructed of five parts, as follows: $a$ is the upper or main portion, of T shape, and bolted to the rear end of the beam. $b$ is a plate, which is bolted to the under side of $a$ and extends a sufficient distance beyond its front edge to admit of the share $c$ being bolted to it, which may be of steel, and the two parts first named of cast-iron. I do not, however, confine myself to material. Cast or wrought iron or steel may be used for any one or all of the parts.

C represents a roller at the rear of the plow, which diminishes the friction caused by the downward pressure of the earth upon the plow as the latter is drawn along. This roller may be attached to the standard or rear part of the beam in such a manner as to be adjustable, and in the manner shown and described in my patent previously alluded to.

D D represent two wings, which may be of steel, and are secured to the ends of the plate $b$ by a single screw-bolt, $d$. The lower ends of these wings are rounded in semicircular form, and are fitted in semicircular recesses $e$ in the ends of the part $a$ of the plow. These wings D D are of twisted or curved form, like the mold-board of an ordinary turn-plow, and they are sharp at both edges, as shown in Fig. 4, and are designed to be kept sharp by grinding, as they may be very readily detached for that purpose, being attached by a single bolt only; and they may also be changed in position—that is to say, changed from one side of the plow to the other—so as to cast the earth outward to a greater or less distance. In the former case the implement would make a furrow, and earth may be thrown toward plants when necessary or desired and in the latter case the earth will pass between the wings and the beam, filling up the furrow in the same way as the device described in the former patent.

The advantage of the present improvement is obvious. The wings D D by their adjustment admit of the earth being thrown more or less outward as occasion may require, and the double cutting-edges of the wings insure the cutting of weeds and trash, preventing the plow being clogged or choked up by the same, under any adjustment of the wings.

Having thus described my invention, I claim as new and desire to secure by Letters Patent—

1. Sharpening or providing the wings D D with double cutting-edges, as and for the purpose described.

2. The wings D D, constructed in such a manner as to be capable of being reversed in position, so as to throw the earth outward to a greater or less distance, and also to be capable of being expanded or contracted as occasion may require, as and for the purpose set forth.

PAUL DENNIS.

Witnesses:
  C. M. DENNIS,
  HERVEY LOSEE.